United States Patent [19]

Bober et al.

[11] Patent Number: 5,271,959
[45] Date of Patent: Dec. 21, 1993

[54] METHOD OF PREVENTING GREASE BUILDUP IN DUCTWORK

[75] Inventors: Andrew M. Bober; John Kawa, both of Racine, Wis.

[73] Assignee: S. C. Johnson & Son, Inc., Racine, Wis.

[21] Appl. No.: 790,959

[22] Filed: Nov. 12, 1991

[51] Int. Cl.⁵ .............................................. B65B 33/00
[52] U.S. Cl. ..................................... 427/155; 427/421
[58] Field of Search ................................ 427/155, 421

[56] References Cited

U.S. PATENT DOCUMENTS

| | | | |
|---|---|---|---|
| 2,890,970 | 7/1954 | Allen | 117/49 |
| 4,039,717 | 8/1977 | Titus | 427/389 |
| 4,097,297 | 6/1978 | Keene | 106/177 |

FOREIGN PATENT DOCUMENTS

| | | |
|---|---|---|
| 2163808 | 12/1971 | France . |
| 2639353 | 12/1988 | France . |
| 50/143657 | 11/1957 | Japan . |

OTHER PUBLICATIONS

Article titled: DuPont Performance Products–Zonyl Fluorosurfactants published by DuPont Company, Wilmington, Del., Dec. 1988.

*Primary Examiner*—Bernard Pianalto

[57] ABSTRACT

A method of protecting vent hoods and exhaust ductwork from buildup of grease and grime comprising coating the vent hoods and exhaust ductwork with a thin coating of a grease repelling removable non-hygroscopic composition.

8 Claims, No Drawings

5,271,959

METHOD OF PREVENTING GREASE BUILDUP IN DUCTWORK

TECHNICAL FIELD

This invention relates to a method for preventing the adherence and ultimate buildup of grease and other grime in vent hoods and exhaust vent ductwork.

In particular, this invention is useful in preventing the buildup of grease and grime and facilitating in the removal of grease and grime from exhaust vent hoods as are commonly used in commercial and institutional kitchens.

In commercial and institutional kitchens, it is necessary to vent fumes, smoke, etc., which are generated during the cooking process. Associated with these fumes and smoke are elements of grease and grime which are airborne solids or are volatilized until they contact the relatively colder surfaces of the hoods and vents. Also, certain amounts of grease and grime are also carried along as finely suspended particulate matter in smoke, etc.

Vent hoods and the associated ducts and fans must be kept clean or otherwise grease and grime which accumulates therein can buildup, increasing the danger of grease fires which can start in the hoods and vent ducts.

The cleaning out of these hoods and vent ducts is a difficult and laborious process, often requiring the physical scraping of the hoods and ductwork to remove the baked-on grease and associated grime or the use of very caustic materials along with high pressure power washing systems.

SUMMARY OF THE INVENTION

This invention relates to a method of preventing the buildup and associated grime in vent hoods and the associated ductwork by coating the ductwork and vent hoods with a thin film of a removable non-hygroscopic coating which also is repellent to the adherence of grease and which enables the vent hood and duct work to be cleaned using much less effort, in some cases as simply as using an alkaline cleaner in a spray bottle with a wiping cloth.

SUMMARY DISCLOSURE OF INVENTION

The present invention relates to a method of preventing the buildup of grease and grime from vent hoods and ductwork comprising coating the vent hoods and ductwork with a thin continuous removeable coating of a grease repelling composition comprising from about 2 to 17% by weight of a low molecular weight alkali resin; from about 0.07 to 0.6% by weight of a temporary metal crosslinking agent selected from the group consisting of zinc oxide and zirconium oxide; sufficient ammonium hydroxide to substantially neutralize the resins; about 2 to 10% by weight of a coalescing solvent; about 3.5 to 13.5% by weight of a high molecular weight acrylic emulsion polymer; about 0.0015 to 0.15% by weight a fluorosurfactant selected from the group consisting of $(R_fCH_2CH_2O)_2 P(O) (ONH_4)$ and mixtures of $(R_fCH_2CH_2O) P(O) (ONH_2)_2$ with a non-fluorinated surfactant where $R_f$ is $F(CF_2CF_2)_n$ with n being a mixture of numbers from 3 to 8; and water.

Best Mode For Carrying Out the Invention

As indicated previously, the process of maintaining vent hoods and associated ductwork in sufficiently clean condition to prevent or lessen the danger of fire in these hoods and exhaust ducts is a difficult and laborious process, often involving manual scraping of the built-up grease and grime from these hoods and vent work. This is obviously a highly labor intensive and arduous task which often is not done in commercial establishments leading to increased danger or risk of fire.

The present invention provides for a removable, temporary non-hygroscopic coating which is impermeable or substantially impermeable to the grease and grime preventing the adherence of these materials to the metal substrate of the hood and/or ductwork. In addition, the composition of the present invention is oil or grease repellent thereby further preventing the buildup of the grease and grime materials on the vent hoods and lengthening the time between which the vents hoods need be fully cleaned.

If the compositions of the present invention were merely sacrificial removeable coatings without being grease and/or oil repellent, the vent hoods and ductwork would soon be coated to the same degree as in the past, the only difference being that the vent hood might be more easily cleaned assuming that the person cleaning the vent hoods and ductwork is able to disrupt the film layer and thereby remove the grime and grease which has collected thereon.

In the present invention however, the thin continuous film is also grease and oil repellent thereby preventing substantial buildup of grease and grime in the hood and exhaust vent ductwork over the period of use and thus both extending the useful period between which the hoods and vents need be cleaned and facilitating the removal of the accumulated grease and grime from the hoods and ductwork when cleaning becomes necessary.

Typically in commercial establishments, cleaning is done on a routine or periodic basis. The process of the present invention lends itself to this periodic maintenance approach since if the vent hood and ductwork is cleaned at intervals of every three months, the repellent properties of the film used in the method of the present invention are sufficient to prevent substantial buildup thereby allowing the underlining removable film to be easily disturbed carrying away with it any additional materials which have been deposited thereon.

As noted above, it is very important that the films useable in the present invention be capable of providing a thin continuous film, which is also easily removeable and which is non-hygroscopic. If the film were not continuous, there would be areas of the vent hood and/or exhaust ducts which would be left exposed, creating difficulties for subsequent cleaning. Furthermore, since the exposed areas would not be repellent, the grease and grime would buildup in these areas. Therefore, the composition should level reasonably well and should be easily applied by either wiping the composition onto the vent hood and exhaust ductwork or by spraying the composition onto these surfaces. The films must be non-hygroscopic because the environment in a cooking hood and exhaust duct often will include steam or other water vapor. If the films are effected by ambient moisture, they will degrade over time and the protective effect will be lost.

The compositions which are useable in the methods of the present invention comprise seven components. The first material in the composition of the present invention is a low molecular weight alkali soluble acrylic resin. These acrylic resins typically have a number average molecular weight of less than 3,000 and should be present in an amount of from 2 to 17% by weight in the composition.

Suitable resin materials include the following: 31% styrene, 37% alpha methyl styrene, 32% acrylic acid (31S/37AMS/32/AA), 67% styrene, 33% acrylic acid (67S/33AA); 45% alpha methyl styrene, 30% ethyl acrylate; 25% acrylic acid (45AMS/30EA/25AA); 82% methyl methacrylate, 18% methacrylic acid (82MMA/18MAA) and the like.

With regard to the amount of resins present in the composition useful in the method of the present invention, it has been found that from 2 to 17% of resin is necessary. Below about 2%, the film becomes discontinuous and does not wet-out properly on the metal surfaces of the vent hoods and ductwork. At amounts over the 17%, the film becomes too brittle and the overall film tends to loose water resistance. Water resistance is an important property of the ultimate films produced by the compositions of the present invention since during the cooking process in industrial, institutional and commercial establishments a substantial amount of moisture in the form of steam also is exhausted through the vent hoods. If these films were not water resistant, steam from cooking would attack the films making them more discontinuous and therefore less effective.

Typical resins suitable for use in the method of the present invention are low molecular weight materials, i.e., those resins with a weight average molecular weight (Mw) of less than 15,000 and preferably less than 10,000. At high molecular weights the resulting films become too brittle to be used.

Preferred amounts of the alkali soluble acrylic resins are from 4 to 9%. The preferred alkali soluble acrylic resin is 32S/32.9AA/35.1AMS The compositions useful in the method of the present invention also include from about 0.07 to 0.6% by weight of a metal temporary crosslinking agent selected from the group consisting of zinc oxide and zirconium oxide.

The activity of zirconium oxide and zinc oxides in basic compositions to perform crosslinks upon drying is well known and has been used for many years in the floor coating art. The preferred metal temporary crosslinking agent is zinc oxide which in combination with ammonium forms a zinc ammonium carbonate complex.

The compositions useful in the method of the present invention also include ammonium hydroxide as the base. Sufficient ammonium hydroxide must be present in the composition both to form to substantially neutralize the alkali soluble resin present and to assist the metal temporary crosslinking agent. The amounts of the ammonium hydroxide necessary to accomplish these tasks are well known in the art. Typically, from about 0.7 to about 6.25% by weight of ammonium hydroxide is preferred.

The compositions useful in the method of the present invention also include from about 2 to about 10% of a coalescing solvent. Suitable coalescing solvents include diethyl glycol monoethyl ether, dipropylene glycol methyl ether, ethylene glycol ethyl ether, ethylene glycol butyl ether and the like.

As noted above, the coalescing should be present in an amount of from 2 to 10% by weight. It is preferred to incorporate from 3 to 5% by weight of coalescing solvent. If the solvent composition is too high, the films will take too long to dry to be used effectively. Also the film will tend to be gummy and sticky. If the composition includes too little coalescing solvent, the films will powder or stress crack and will not properly repel the grease and other materials.

The compositions suitable for use in the method of the present invention also include from about 3.5 to 13.5% by weight of a high molecular weight acrylic emulsion polymer. These emulsion polymers can be made by any conventional emulsion polymerization process. Suitable emulsion polymers include styrene, alphamethyl styrene, methyl methacrylate, butyl acrylate, methacrylic acid, and 2-ethylhexylacrylate as monomers. Typical monomer compositions include 43% methyl methacrylate, 48% butyl acrylate, 9% methacrylic acid (43MMA/48BA/9MAA); 35% styrene, 12% of alpha methylstyrene, 7% methyl methacrylate, 33% butyl acrylate, 13% methacrylic acid (35S/12AMS/7MMA/33BA/13MAA); 10% styrene, 55% methyl methacrylate, 30% butyl acrylate, 5% methacrylic acid (10S/55MMA/33BA/5MAA); 25% styrene, 35% methyl methacrylate, 30% butyl acrylate, 10% methacrylic acid (25S/35MMA/30BA/10MAA); 30% styrene, 10% alphamethastyrene, 33% butyl acrylate, 10% methyl methacrylic, 17% methacrylic acid (30S/10AMS/33BA/10MMA/17MAA); 35% styrene, 15% methyl methacrylate, 26% butyl acrylate, 10% 2-ethylhexylacrylate, and 14% methyl methacrylate (35S/15MMA/26BA/10 2-EHA/14MAA) and the like. Typical emulsion polymers suitable for use in the present invention are incorporated as from 30 to 50% by weight of solids.

On a solids basis, the composition suitable for use in the method of the present invention should contain from 3.5 to 13.5% of the emulsion polymer material. Typical weight average molecular weights of these emulsion polymers are in excess of 100,000 weight average molecular weight. These emulsion polymers typically have a glass transition temperature greater than about 30° C. The polymer is in the composition to provide film integrity. Films without polymers tend to be too brittle to be used in the method of the present invention. Use of an excess of polymer causes the film to take too long to dry.

The compositions suitable for use in the method of the present invention also include a fluorosurfactant. Only a small percentage of fluorosurfactant is necessary to be included in the composition of the present invention. Typically on a solids basis, 0.0015 to 0.15% by weight of the fluorosurfactant should be included. It is preferred to use from 0.01 to 0.09% of a fluorosurfactant. These fluorosurfactants should be selected from the group consisting of $(R_fCH_2CH_2O)_2 P(O) (ONH_4)$ and mixtures of $R_fCH_2CH_2O P(O) (ONH_2)_2$ with a non-fluorinated surfactant where $R_f$ is $F(CF_2CF_2)_n$ with n being a mixture of numbers from 3 to 8. It has been found that only certain fluorinated surfactants work in the compositions of the method of the present invention. Other fluorinated surfactants do not sufficiently repel grease and grime to be sufficiently useful in the method of the present invention. If the composition contains too little fluorosurfactant, the composition is not sufficiently repellent to grease. If the level of fluorosurfactant is too high, then film loses its integrity and tends to become too brittle and powder.

The compositions suitable for use in the method of the present invention need to be non-hygroscopic, i.e., be relatively unaffected by moisture so that the exposure to steam from cooking does not soften or destroy the film. The compositions should also be readily removable with a relatively mild cleaning solution such as an alkaline cleaner as is often used to remove floor finishes. Lastly, the compositions should have a contact angle of greater than 43° to peanut oil on stainless steel. Films with a contact angle of greater than 43° are sufficiently repellent to grease to be usable in the present invention. Although the amount of material used to coat the hood and duct work is mostly dictated by economic considerations, the coating must be continuous otherwise grease will build up in the discontinuous areas. Typical applications range from 100 gms/m² to 300 gms/m² of coating.

The films suitable for use in the method of the present invention must be sufficiently non-hygroscopic to withstand at least one month in a commercial kitchen vent hood without noticeable effect, i.e., softening, loss of integrity, etc. due to moisture. Therefore the term "non-hygroscopic" when used in this invention means a film which will not show any substantial change in physical properties after exposure to conditions which exist in a commercial kitchen vent hood for a period of at least one month.

As a last component the compositions of the method of the present invention is water as a carrier. The water is added to the composition in order to make the composition suitable to be applied to the vent hoods and ductwork. Depending upon whether the compositions applied by a roll coater or other physical application means or by spraying, the composition and solids level of the components of the present invention may vary. Typically, however, the solids should be in an amount of from 15 to 25% by weight.

The method of the present invention will now be illustrated by way of the following Examples which are for the purposes of illustration only.

Example 1

A coating composition having the following formulation was prepared by mixing the following components together.

| | Parts by Weight |
|---|---|
| Acrylic Resin | 7.44 |
| 32S/33AMS/35AA Mw = 5800 | |
| Ammonium Hydroxide (28%) | 2.75 |
| Zinc Oxide | 0.27 |
| Emulsion Polymer (35%) | 15.43 |
| 35S/12AMS/7MMA/33BA/12MAA Mw = 125,000 | |
| AC-392 Polyethylene Wax Emulsion (18.8%) | 4.32 |
| E-43 Polypropylene Wax Emulsion (30%) | 5.40 |
| Fragrance | 0.15 |
| Octyl Phenol Ethoxylate 30 Moles EO | 0.77 |
| FC-120 Fluorochemical (3M) | 0.01 |
| Zonyl ® FSJ Fluorochemical (DuPont) (40%) | 0.05 |
| Oleic Acid | 0.54 |
| Tributoxyethyl Phosphate | 0.72 |
| Diethylene Glycol Monoethyl Ether | 3.00 |
| Water | 59.15 |

AC-392 is a polyethylene wax available from Allied Signal. It has been emulsified with 14.6% Diethylaminoethanol oleate.
E-43 is Epolene ® E-43 polypropylene wax available from Eastman Chemical. It has been emulsified with 8.7% Neodol ® 25-9, linear C₁₂-C₁₅ alcohol ethoxylate, 9 moles EO from Shell along with 2.7% of a 53.2% solution of zinc ammonium carbonate and 4.7% of a 45% solution of KOH.
FC-120 is a solution of an anionic fluorochemical surfactant available from 3M.

Place about 24 parts of Water into a stirred kettle, heat to 130° F. (54° C.) and begin agitation. Add the Ammonium Hydroxide and Zinc Oxide. Then add the Acrylic Resin, Oleic Acid and Tributoxyethyl Phosphate and agitated until the Zinc Oxide is in solution. Add the rest of the components in the following order: Octyl Phenol Ethoxylate, the rest of the water, Diethylene Glycol Monoethyl Ether, both Fluorochemicals, the Acrylic Emulsion Polymer, both Wax Emulsions and fragrance. Agitate the mixture to uniformity. The formula may need to passed through a 10 micron filter.

The above formulation was applied to a vent hood and vent duct in a commercial kitchen at a rate of 170 gms/m². After the Hood was used to exhaust smoke from the kitchen for 3 months, it was inspected and it was found that the grease did not adhere to the surface of the hood and the ductwork. Also it was found that the film was intact and substantially unaffected by the moisture present in the exhaust materials. The hood and ductwork could be cleaned using an alkaline cleaner.

Example 2

The following coating composition was prepared using the procedure of Example 1.

| | Parts by Weight |
|---|---|
| Acrylic Resin | 7.44 |
| 32S/33AMS/35AA Mw = 5800 | |
| Ammonium Hydroxide (28%) | 2.75 |
| Zinc Oxide | 0.27 |
| Emulsion Polymer (35%) | 15.43 |
| 35S/12AMS/7MMA/33BA/12MAA Mw = 125,000 | |
| Octyl Phenol Ethoxylate 30 Moles EO | 0.77 |
| FC-120 Fluorochemical (3M) | 0.01 |
| Zonyl ® FSJ Fluorochemical (DuPont) | 0.05 |
| Oleic Acid | 0.54 |
| Tributoxyethyl Phosphate | 0.72 |
| Diethylene Glycol Monoethyl Ether | 3.00 |
| Water | 69.02 |

The above composition was spread onto steel "Q" panels test panels of steel available from the Q Panel Corporation, and allowed to cure for 48 hours. This composition formed a The above composition was spread onto steel "Q" panels, test panels of steel available from the Q Panel Corporation, and allowed to cure for 48 hours. This composition formed a good film. 1 ml of peanut oil was placed on the film and spread with a cheesecloth. The oil immediately headed up.

Examples 3–4 and Comparative Examples A–L

The following base formula was prepared using the procedure of Example 1:

| | Parts by Weight |
|---|---|
| Acrylic Resin | 7.55 |
| 32S/33AMS/35AA Mw = 5800 | |
| Ammonium Hydroxide (28%) | 2.79 |
| Zinc Oxide | 0.27 |
| Water | 60.03 |
| Diethylene Glycol Monoethyl Ether | 3.05 |
| Octyl Phenol Ethoxylate 30 Moles EO | 0.78 |
| Emulsion Polymer (35%) | 15.66 |
| 35S/12AMS/7MMA/33BA/12MAA Mw = 125,000 | |
| AC-392 Polyethylene Wax Emulsion (18.8%) | 4.39 |
| E-43 Polypropylene Wax Emulsion (30%) | 5.48 |

The fluorochemicals as shown in Table 1 were added as 1.5 parts by weight of a 1% aqueous solution to 98.5% by weight of the base formula. The films formed from these formulas were allowed to cure as in Example 2 and the film properties were observed. The films were tested with the peanut oil test as described in Example 2.

TABLE 1

| Example | Fluorochemical | Oil Test | Film Appearance |
|---|---|---|---|
| 3 | Zonyl ® FSJ | Pass | Good Film |
| 4 | Zonyl ® FSE | Pass | Good Film |
| A | FC-120 | Fail | Good Film |
| B | FC-99 (3M) | Fail | Good Film |
| C | FC-100 (3M) | Fail | Good Film |
| D | FC-129 (3M) | Fail | Good Film |
| E | FC-170C (3M) | Fail | Good Film |
| F | FC-135 (3M) | Fail | Good Film |
| G | FC-430 (3M) | Fail | Good Film |
| H | Zonyl ® FSK | Fail | Good Film |
| I | Zonyl ® FSP | Pass | Pocked |
| J | Zonyl ® FSN | Fail | Good Film |
| K | Zonyl ® TBS | Fail | Good Film |
| L | Zonyl ® FSO | Fail | Good Film |
| M | Zonyl ® FSA | Fail | Good Film |

Good = The Oil beads up.
Fail = The Oil remains spread out.
Good Film = The film is continuous and does not crack or powder.
Pocked = The film is pock marked and irregular.
FC-99 is a solution of amine perfluoroalkyl sulfonate available from 3M.
FC-100 is a solution of sodium fluoroalkyl sulfonate available from 3M.
FC-129 is a solution of potassium fluoroalkyl carboxylate available from 3M.
FC-170C is a nonionic fluorochemical surfactant available from 3M.
FC-135 is a cationic fluorochemical surfactant available from 3M.
FC-430 is a nonionic fluorochemical surfactant available from 3M.
Zonyl ® FSE is $(R_fCH_2CH_2O)_2P(O)(ONH_4)$ with $R_f = F(CF_2CF_2)_{3-8}$ available from DuPont
Zonyl ® FSK is $R_fCH_2CH(OCOCH_3)CH_2N^+(CH_3)2CH2CO2^-$ available from DuPont.
Zonyl ® FSP is $(R_fCH_2CH_2O)P(0)(ONH_4)_2$ available from DuPont.
Zonyl ® FSN is $R_fCH_2CH_2O(CH2CH2)xH$ available from DuPont.
Zonyl ® TBS is $R_fCH_2CH_2SO_3X$ (X = H and $NH_4$) available from DuPont.
Zonyl ® FSO is $R_fCH_2CH_2O(CH2CH2)yH$ available from DuPont.
Zonyl ® FSA is $R_fCH_2CH_2SCH_2CH_2CO_2Li$ available from DuPont.

The above Examples show that only certain fluorochemicals will properly work in the method of the present invention.

Example 5 and Comparative Example N The following two formulas were prepared as in Example 1:

|  | Ex. 5 | Comp. Ex. N |
|---|---|---|
| Acrylic Resin 32S/33AMS/35AA Mw = 5800 | 7.55 | 7.55 |
| Ammonium Hydroxide (28%) | 2.79 | 2.79 |
| Zinc Oxide | 0.27 | 0.27 |
| Emulsion Polymer (35%) 35S/12AMS/7MMA/33BA/12MAA Mw = 125,000 | 15.43 | 15.43 |
| FC-120 (3M) (1% Soln.) | 0.25 | 0.25 |
| Zonyl ® FSJ (DuPont) (1% Soln) | 1.25 | 1.25 |
| Diethylene Glycol Monoethyl Ether | 3.00 | 0.0 |
| Water | 69.46 | 72.46 |

Both compositions were coated on steel "Q" panels. The film of Example 5 looks good both initially and after one week. The film of Comparative Example N looks good initially, but after 3 days begins to powder and shows severe powdering and lack of film integrity after one week. The film of Example 5 when tested for oil repellency, as in Example 2, immediately beads oil.

Example 6

|  | Parts by Weight |
|---|---|
| Preparation of Resin Cut A: | |
| Water | 70.35 |
| Zinc Oxide | 0.77 |
| Acrylic Resin | 21.09 |

-continued

|  | Parts by Weight |
|---|---|
| 32S/33AMS/35AA Mw = 5800 | |
| Ammonium Hydroxide (28%) | 7.79 |

The above components were mixed together in a three-necked flask. The order of addition is as listed. Agitate the flask after each addition and heat to 125° F. (52° C.) with agitation for two hours. The solution is initially hazy, but clears overnight.

|  | Parts by Weight |
|---|---|
| Resin Cut A | 35.28 |
| Water | 44.79 |
| Emulsion Polymer (35%) 35S/12AMS/7MMA/33BA/12MAA Mw = 125,000 | 15.43 |
| Zonyl ® FSJ (DuPont) (1% Soln) | 1.50 |
| Diethylene Glycol Monoethyl Ether | 3.00 |

The formulation is cast as a film on a steel "Q" panel. Although the film does not level well and shows evidence of brush marks, the film is continuous and shows not evidence of powdering or other discontinuities.

Example 7 and Comparative Examples O-P

The formula of Example 6 was modified to determine the levels of Fluorochemical that can be used. As the fluorochemical is changed the water content is changed to make 100 parts. The amount of Water and 1% solution of Zonyl ® FSJ are shown in Table 2.

TABLE 2

| Example | Parts Water | Parts Zonyl ® FSJ |
|---|---|---|
| 7A | 46.14 | 0.15 |
| 7B | 33.29 | 13.00 |
| C. Ex. O | 31.29 | 15.00 |
| C. Ex. P | 16.29 | 30.00 |

For Examples 7A and 7B, the films formed have good film integrity, although Example 7B shows some striation in the film and but no evidence of powdering along the striations. Comparative Examples O and P have film discontinuities, with Comparative Example P being much worst showing strong film fracture and powdering.

In the oil repellency test, Example 7A shows some beading of the oil and the oil collects into streaks of oil. Example 7B shows strong beading of oil. Comparative Examples O and P show beading of oil only in the continuous portions of the film.

Example 8 and Comparative Examples Q

The formulation of Example 6 is repeated except that the level of the Resin Cut A is varied as shown in Table 3. The Water content is also varied to make 100 parts.

TABLE 3

| Example | Parts Water | Parts Resin Cut A |
|---|---|---|
| 8A | 70.07 | 10.00 |
| 8B | 20.07 | 60.00 |
| 8C | 10.07 | 70.00 |
| 8D | 0.07 | 80.00 |
| C. Ex. Q | 75.07 | 5.00 |

Examples 8A-D all formed continuous films with excellent oil beading. Comparative Example Q did not form a continuous film and did not coat areas of the steel plate that were not perfectly clean, such as fingerprints. Oil beads in the continuous areas.

Example 9 and Comparative Examples R-S

The formulation of Example 6 is repeated except that the level of the Diethylene Glycol Monoethyl Ether (Solvent) is varied as shown in Table 4. The Water content is also varied to make 100 parts.

TABLE 4

| Example | Parts Water | Parts Solvent |
|---------|-------------|---------------|
| 9A | 45.79 | 2.00 |
| 9B | 44.79 | 3.00 |
| 9C | 37.79 | 10.00 |
| C. Ex. R | 32.79 | 15.00 |
| C. Ex. S | 46.29 | 1.50 |

Examples 9A-C all formed continuous films with excellent oil beading. Example 9A showed very slight stress cracking over time. Example 9C took about 1½ hours to dry. Comparative Example R was still tacky and gummy after 1½ hours, while Comparative Example S showed heavy stress cracking resulting in a discontinuous film.

Example 10 and Comparative Examples T-U

The formulation of Example 6 is repeated except that the level of the Emulsion Polymer is varied as shown in Table 5. The Water content is also varied to make 100 parts.

TABLE 5

| Example | Parts Water | Parts Emuls. Polymer |
|---------|-------------|----------------------|
| 10A | 50.22 | 10.00 |
| 10B | 30.22 | 30.00 |
| 10C | 20.22 | 40.00 |
| 10D | 10.22 | 50.00 |
| C. Ex. T | 5.22 | 55.00 |
| C. Ex. U | 55.22 | 5.00 |

Examples 10 A-C produced good films with good oil repellency. Example 10D showed slight cracking in thicker areas of the film with good oil repellency. Comparative Example T produced a film with heavy cracking and discontinuities. Comparative Example U formed a good film initially but the film formed stress cracks after 4 days.

Example 11

The formulations as shown in Table 6 were prepared as in Example 6.

TABLE 6

|  | 11A | B | C | D | E |
|---|-----|---|---|---|---|
| Resin Cut A (Ex. 6) | 35.28 | 35.28 | 35.28 | 35.28 | 35.28 |
| Water | 46.72 | 43.85 | 43.85 | 44.79 | 46.72 |
| Emulsion Polymer A | 13.50 | — | — | — | — |
| Emulsion Polymer B | — | 16.37 | — | — | — |
| Emulsion Polymer C | — | — | 16.37 | — | — |
| Emulsion Polymer D | — | — | — | 15.43 | — |
| Emulsion Polymer E | — | — | — | — | 13.50 |
| Zonyl ® FSJ (1% Soln) | 1.5 | 1.5 | 1.5 | 1.5 | 1.5 |
| Diethylene glycol | 3.0 | 3.0 | 3.0 | 3.0 | 3.0 |

TABLE 6-continued

|  | 11A | B | C | D | E |
|---|-----|---|---|---|---|
| monoethyl ether | | | | | |

Emulsion Polymer A is 43MMA/48BA/9MAA with a Mw of 265,000 (40% solids).
Emulsion Polymer B is 10S/55MMA/30BA/5MAA with a Mw of 383,000 (33% solids).
Emulsion Polymer C is 25S/35MMA/30BA/10MAA with a Mw of 325,000 (33% solids).
Emulsion Polymer D is 30S/10AMS/33BA/10MMA/17MAA with a Mw of 150,000 (35% solids).
Emulsion Polymer E is 35S/15MMA/26BA/40 2-EHA/14MMA with a Mw of 92,000 (40% solids).

Each of the above formulations produced a good film which shows oil repellent properties, however Example 11E was not as effective as the other Examples in beading oil.

Industrial Applicability

The method of the present invention is useful in preventing the buildup of grease and grime in vent hoods and other exhaust devices for kitchens and other areas where cooking occurs. The method makes the cleaning of these vent areas easier and aids in the prevention of fires.

What I claim is:

1. A method of protecting vent hoods and exhaust ductwork from buildup of grease and grime comprising coating the vent hoods and the ductwork with a thin coating of grease repelling composition which is removable using a cleaner having a pH of between 9-12, which coating contains an effective amount of a fluoro surfactant to repel grease and which has a contact angle on stainless steel of greater than 43° to peanut oil and which coating is non hygroscopic, wherein the grease repelling composition comprises:

a) about 2 to 17% by weight of a low molecular weight alkali soluble acrylic resin;
   b) about 0.07 to 0.6% by weight of temporary metal crosslinking agent selected from the group consisting of zinc oxide and zirconium oxide;
   c) sufficient ammonium hydroxide to substantially neutralize the resin;
   d) about 2 to 10% by weight of a coalescing solvent;
   e) about 3.5 to 13.5% by weight of a high molecular weight acrylic emulsion polymer;
   f) about 0.0015 to 0.15% by weight a fluorosurfactant selected from the group consisting of $(R_f CH_2 CH_2 O)_2 P(O)(ONH_4)$ and mixtures of $(R_f CH_2 CH_2 O) P(O)(ONH_2)_2$ with a nonflurinated surfactant where $R_f$ if $F(CF_2 CF_2)_n$, with n being a mixture of numbers from 3 to 8; and
   g) water.

2. The method of claim 1 wherein the coating is applied at a rate of 100 to 300 gm/m².

3. The method of claim 1 wherein the emulsion polymer has a weight average molecular weight of greater than 100,000.

4. The method of claim 1 wherein the resin has a weight average molecular weight of less than 15,000.

5. The method of claim 1 wherein the solvent is selected from the group consisting of diethyl glycol monoethyl ether, dipropylene glycol methyl ether, ethylene glycol ethyl ether, and ethylene glycol butyl ether.

6. The method of claim 1 wherein the crosslinking agent is zinc oxide.

7. The method of claim 1 wherein the fluorosurfactant is a mixture of $(R_fCH_2CH_2) P(O) (ONH_2)_2$ with a nonfluorinated surfactant.

8. The method of claim 1 wherein the composition comprises:
   a) 4 to 9% of alkaline soluble acrylic resin with a Mw of less than 10,000;
   b) 0.07 to 0.6% of zinc oxide;
   c) 0.7 to 6.25% of ammonium hydroxide;
   d) 3 to 5% of a coalescing solvent;
   e) 3.5 to 13.5% of an acrylic emulsion polymer with weight average molecular weight of greater than 100,000;
   f) 0.01 to 0.09% of a fluorosurfactant selected from the group consisting of and $(R_fCH_2CH_2O)_2 P(O) (ONH_4)$ and mixtures of $(R_fCH_2CH_2O) P(O) (ONH_2)_2$ with a nonfluorinated surfactant where $R_f$ is $F(CF_2CF_2)_n$, with n being a mixture of numbers from 3 to 8; and
   g) water.

* * * * *

UNITED STATES PATENT AND TRADEMARK OFFICE
CERTIFICATE OF CORRECTION

PATENT NO. : 5,271,959

DATED : December 21, 1993

INVENTOR(S) : Andrew M. Bober and John Kawa

It is certified that error appears in the above-identified patent and that said Letters Patent is hereby corrected as shown below:

In column 10, line 47, insert --of-- after the word "weight".

In column 10, line 51, the word "if" should be --is--.

In column 12, line 5, delete the word "and".

Signed and Sealed this

Twenty-first Day of March, 1995

Attest:

BRUCE LEHMAN

Attesting Officer    Commissioner of Patents and Trademarks